United States Patent [19]

Hannon et al.

[11] 4,171,056
[45] Oct. 16, 1979

[54] COATED BOTTLE AND METHOD OF COATING

[75] Inventors: Martin J. Hannon, Martinsville; Alex S. Forschirm, Parsippany; Richard K. Greene, Summit, all of N.J.

[73] Assignee: Celanese Corporation, New York, N.Y.

[21] Appl. No.: 844,820

[22] Filed: Oct. 25, 1977

[51] Int. Cl.² .............. B65D 11/16; B05D 3/02; B05D 1/36
[52] U.S. Cl. ................ 215/12 R; 427/189; 427/195; 427/201; 427/203; 427/222; 428/35
[58] Field of Search .......... 428/35; 215/12 R; 427/189, 195, 201, 203, 222, 425

[56] References Cited

U.S. PATENT DOCUMENTS

| | | | |
|---|---|---|---|
| 3,686,365 | 8/1972 | Sequeira | 260/880 B |
| 3,810,957 | 5/1974 | Lunk | 260/880 B |
| 3,823,032 | 7/1974 | Ukai | 428/35 |
| 3,919,440 | 11/1975 | Takahashi et al. | 428/35 |
| 3,932,327 | 1/1976 | Naylor | 260/876 B |
| 4,027,067 | 5/1977 | Wagner et al. | 427/385 B |

Primary Examiner—William R. Dixon, Jr.

[57] ABSTRACT

A coated bottle comprising a bottle having an inner and an outer coating is disclosed. The inner coating applied to the external surface thereof is prepared from non-tacky composite powder particles which are made up of powder particles which have surface deposited thereon comparatively smaller solid particles which are hard and non-tacky. The tacky powder particles comprise a mixture of a thermoplastic elastomer, a specifically defined melt flow modifier, and an adhesion promoter. The smaller, hard particles comprise a specifically defined melt flow modifier which has a glass transition temperature of at least about 20° C. The first coating is applied to the bottle, preferably by electrostatic spraying techniques, and the bottle with the particles is baked to form a smooth coating. An outer coating comprising certain particularly defined synthetic resins, particularly acrylic polymers, is then applied and the coated bottle is again baked until a smooth second coat is formed. The coated bottle is fragment retentive and this coating is not substantially removed or destroyed during the cleaning and sterilization procedures commonly employed by carbonated beverage bottling companies.

42 Claims, No Drawings

COATED BOTTLE AND METHOD OF COATING

BACKGROUND OF THE INVENTION

1. Field of the Invention

This invention relates to polymeric compositions useful in coating applications. More specifically, this invention relates to polymer compositions having good melt flow under zero shear conditions and useful in coating various substrates such as glass bottles which are employed as containers particularly in the carbonated beverage and beer industries.

2. Description of the Prior Art

The hazards of using glass containers, particularly glass bottles which contain beer or carbonated beverages, are well known. Breakage of such bottles often takes place due to the internal pressure exerted by the pressurized gas in the carbonated beverage or beer as well as by dropping the bottles and other impacts caused by external forces which occur not only in the course of production and distribution of the bottled product, but also as a result of handling of the bottled product by consumers. Such breakage may result in injuries to the human body.

Coatings have been applied to such bottles in order to prevent scattering of the broken glass upon breakage. In this connection, see West German Patent DT2,636,157 and U.S. Pat. No. 3,823,032. The latter patent discloses that thermoplastic elastomers such as block copolymers of styrene and butadiene are useful in coating glass bottles. Thermoplastic elastomeric compositions, having improved environmental resistance, are disclosed in U.S. Pat. No. 3,686,365. These polymeric compositions comprise (a) about 80 to 99 percent of block copolymers having at least two mono alpha alkenyl arene polymer blocks and at least one conjugated diene polymer block and (b) about 20 to 1 percent of a selectively hydrogenated block copolymer having, prior to hydrogenation, at least one mono alpha alkenyl arene polymer block and at least one conjugated diene polymer block, said block copolymer having been selectively hydrogenated to saturate at least 80 percent of the olefinic double bonds and 0 to 25 percent of the aromatic double bonds.

Because of the rather recent concern with environmental considerations, it is especially desirable to be able to apply protective coatings to various substrates such as glass bottles in a non-polluting manner. The use of solid powder particles to coat these substrates eliminates the need for solvent and the accompanying environmental problems. In this connection, see U.S. Pat. No. 3,737,401.

When the powder particles are deposited upon a substrate such as a glass bottle, the particles must be heated to provide a uniform molten coating on the glass bottle. The coating is then cooled to provide a uniform solid coating on the bottle.

When certain thermoplastic elastomers such as styrene/butadiene/styrene block copolymers are used as a major component of the powder particles, the melt flow of the thermoplastic elastomers is not sufficient to provide a uniform molten coating. Although it is known to use copolymers of alphamethylstyrene and styrene with certain elastomers to produce pressure sensitive adhesives and to use such additives in hot melt coatings (see U.S. Pat. No. 3,932,332), the use of this additive does not provide sufficient flow in thermoplastic elastomers at temperatures below that at which the thermoplastic elastomer discolors.

It is also known to use hydrogenated aromatic hydrocarbon petroleum resins as tackifiers for polymers such as styrene/isoprene/styrene block copolymers in a hot melt adhesive. For example, United States Defensive Publication T917008 discloses a hot melt adhesive containing a tackifier which is derived from a polymerized cracked naphtha fraction and having a boiling point between −10° and 280° C. This fraction contains polymerizable unsaturated hydrocarbons, inert paraffins and alkyl benzenes. The polymerizable unsaturated hydrocarbons present in the fraction include aromatic olefins, cyclic olefins, cyclic diolefins, aliphatic olefins and aliphatic diolefins. Of the unsaturated hydrocarbon content, at least about 50% by weight, consists of a mixture of aromatic olefins, cyclic olefins and cyclic diolefins. The aromatic olefins present in the petroleum fraction include styrene, alpha-methylstyrene, vinyl toluene, vinyl xylene, propenyl benzene, indene, methyl indene, ethyl indene, and the like. The cyclic olefins and cyclic diolefins include cyclopentene, cyclopentadiene, dicyclopentadiene, cyclohexene, cyclooctene, and the like. The aliphatic olefins and aliphatic diolefins include butene, butadiene, pentene, pentadiene, octadiene, and the like.

The problem of melt flow of thermoplastic elastomers exists not only with respect to coatings useful for glass bottles but also for other coating applications and for large part molding such as roto casting.

A particularly efficacious method for solving the above-identified problems is disclosed in United States Patent Application Ser. No. 844,963, entitled "Powder Composition and Method of Preparation" and filed concurrently herewith by Martin J. Hannon and Alex S. Forschirm. However, the powder particles produced by this method tend to coalesce and become somewhat tacky, lumpy materials which are somewhat difficult to spray. These powders tend to produce coatings which have the appearance of an orange peel. Since these coatings tend to be rather lumpy, their appearance, adhesive properties and glass fragment retention are not as good as they would be if such lumpiness could be eliminated.

This tendency of thermoplastic elastomers to stick together, coalesce, agglomerate and/or exhibit "blocking," results from an undesired adhesion between touching particles such as occurs under moderate pressure during storage of the particles. Particularly, storage under somewhat elevated temperatures, and under pressures caused by stacking bales or packages of polymer, create conditions favorable for such agglomeration. If the particles of the polymers agglomerate, then it frequently becomes necessary to grind, crush, or otherwise masticate the mass in order to reseparate the particles or to again produce a utilizable particulate material. Such mechanical treatment is burdensome and undesirable because of inconvenience, added labor and time, cost, possible contamination of the elastomer, and possibly in some instances even degradation of some of the polymeric products due to the additional working, temperature, and the like.

In attempting to ease this problem, it is known to apply a dusting agent such as carbon black, talc, zinc stearate, rice flour, chalk, magnesium oxide, infusorial earth, or the like, to the particles in an effort to counteract the natural tackiness or blockiness of the particulate-form polymers. All of these dusting agents, however, have some objectionable characteristics. For example, adding color to the natural polymer may be undesirable for some purposes. The dusting agents may be objectionable for some end uses, such as in clear coatings where the presence of such agents could cause haziness. Silica powder and some grades of talc may possibly pose health hazards under some circumstances that will restrict their use. Stearate powders at levels sufficient to combat tackiness may adversely affect polymer performance properties such as tack, adhesion, optical clarity, and the like.

For a more detailed discussion of the disadvantages of prior art attempts to solve this general problem, see U.S. Pat. Nos. 3,528,841 and 4,027,067 and British specification No. 1,200,532. The disclosure of U.S. Pat. No. 4,027,067 is hereby incorporated by reference.

A particularly efficacious method for solving the agglomeration problem associated with thermoplastic elastomers is disclosed in United States Patent Application Ser. No. 844,812, entitled "Powder Composition and Method of Preparation" and filed concurrently herewith by Martin J. Hannon and Richard K. Green. The disclosure of this patent application is hereby incorporated by reference.

Because of the recent concern over environmental considerations, it is becoming increasingly important to have glass containers which are not only fragment retentive but also returnable, i.e., reusable. Returnable bottles must have coatings which will not substantially degrade, peel off or become substantially less firmly attached to the glass after repeated washings and sterilization procedures.

The search has continued for improved fragment retentive and returnable glass bottles useful in the carbonated beverage and beer industries. This invention was made as a result of that search.

OBJECTS AND SUMMARY OF THE INVENTION

Accordingly, a general object of the present invention is to avoid or substantially alleviate the above problems of the prior art.

It is a further object of the present invention to provide glass containers which are fragment retentive.

Another object of the present invention is to provide glass containers which are returnable.

Still another object of the present invention is to provide a process for preparing glass containers which are both fragment retentive and returnable.

Other objects and advantages of the invention will become apparent from the following summary and description of the preferred embodiments of the present invention.

In one aspect, the present invention provides a glass container coated on its outer surface to prevent the scattering of glass fragments. This coated glass container comprises A. a glass container
B. an inner coat of a non-tacky powder composition intimately contacted on the external wall surface of the bottle, and
C. an outer coat of a synthetic resin covering substantially the entire surface of the inner coat and a part of the glass bottle surface.

The inner coat is prepared from powder particles which comprise tacky powder particles, and, adhering to the tacky surface of these tacky particles in a non-continuous layer, smaller solid particles which are hard and non-tacky.

The tacky powder particles comprise a mixture of
(a) a block copolymer which is either unhydrogenated or selectively hydrogenated to at least some degree and having at least two kinds of polymer blocks wherein one polymer block is designated as A and a second polymer block is designated as B such that prior to hydrogenation,
  (1) each A is a polymer end block of a monovinyl or alpha alkyl monovinyl arene having a number average molecular weight in the range of from about 5,000 to about 75,000, the blocks A comprising from about 5 to about 50% by weight of the total block copolymer, and
  (2) each B is a polymer mid block having a number average molecular weight of from about 30,000 to about 300,000, and formed from a conjugated diene selected from homopolymers of at least one conjugated diene having 4 to 10 carbon atoms per molecule, the blocks B comprising from about 50 to about 95% by weight of the total block copolymer, and
(b) at least one melt flow modifier selected from the group consisting of
  (1) monovinyl arene homopolymers,
  (2) alpha alkyl monovinyl arene homopolymers, and
  (3) copolymers of monovinyl arenes and alpha alkyl monovinyl arenes
  wherein the aromatic portions of the polymers described in (b)(1), (2), and (3) are at least partially hydrogenated to remove the aromatic character thereof, and
(c) at least one adhesion promoter.

The smaller solid particles are hard and non-tacky and comprise at least one melt flow modifier described in (b)(1) above with the provision that such a melt flow modifier have a glass transition temperature of at least about 20° C.

The outer coat comprises a synthetic resin selected from the group consisting of epoxy resins, polyurethanes, polycarbonates, polyesters, polystyrenes, ethylene/vinyl acetate copolymers and acrylic homopolymers and copolymers wherein the outer film has high abrasion resistance, wet and dry scratch resistance, water resistance, chemical resistance, oil resistance, and weather resistance.

In another aspect, the present invention provides a process for coating a glass container. This process comprises A. preheating a glass container,
B. applying on the external wall surface of the container the powder composition described above,
C. baking the coated container until the powder particles become molten and form a smooth, molten coating on the glass surface,
D. applying to the coated container a synthetic resin selected from the group consisting of epoxy resins, polyurethanes, polycarbonates, polyesters, polystyrenes, ethylene/vinyl acetate copolymers and acrylic homopolymers and copolymers wherein the synthetic resin is applied to substantially the entire surface of the first coating and also to a part of the glass bottle surface,
E. baking the coated container until the synthetic resin forms a smooth coating, and F. cooling the coated bottle to substantially ambient temperature.

The essence of the present invention is the discovery that when glass containers such as glass bottles are coated with the particularly defined powder composition and synthetic resins described hereinabove, the coated glass bottle is rendered fragment retentive. Furthermore, the coating on the bottle is not substantially removed or destroyed during the cleaning and sterilization procedures commonly employed by carbonated beverage bottling companies.

DESCRIPTION OF THE PREFERRED EMBODIMENTS

Thermoplastic elastomers are polymeric materials that behave in some ways like thermoplastics and in other ways like elastomers. They behave like thermoplastics in that above their softening point they may be processed using ordinary plastics processing equipment. For example, they may be formed by thermoplastic injection molding, extrusion, blow molding, or vacuum forming. On the other hand, when utilized below their softening point, they behave like elastomers, i.e., they exhibit the properties normally associated with vulcanized rubbers without having been subjected to vulcanization. Thus, such polymers have the elastic and resilient properties of rubber but may be processed and reprocessed like ordinary thermoplastics.

The thermoplastic copolymers useful in the present invention are block copolymers having at least two kinds of polymer blocks. Copolymers useful in the present invention are described in "Applied Polymer Science," Chapter 29, p. 394ff, of *Organic Coatings and Plastics Chemistry* (Craver & Tess, 1975) which is hereby incorporated by reference.

Preferred block copolymers for use in the present invention are radial or branched block copolymers. By "radial" or "branched" copolymers is meant copolymers having the general configuration

wherein each A group is a terminal block segment comprising a polymer made from a monovinyl or alpha alkyl monovinyl arene and each B is a block segment comprising a polymer made from a conjugated diene, Z is derived from a polyfunctional compound having at least three reactive sites, and n is not less than 3. The radial block copolymer, as herein defined, must have at least three block copolymer branches radiating from a nucleus Z.

The "Z" group which forms the nucleus from which the polymer blocks of the radial block copolymer radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides and the like. A preferred polyfunctional compound is a silica containing compound.

The preparation of the preferred radial block copolymers of this invention may be by any technique known to those skilled in this art, such as those described in U.S. Pat. Nos. 3,932,327; 3,692,874 and 3,281,383, the disclosures of which are all hereby incorporated by reference.

These radial block copolymers are available commercially as Solprene thermoplastic elastomers.

An important subgroup of these block copolymers comprises those thermoplastic elastomers in which the olefinic double bonds in the diene polymer blocks are converted to saturated hydrocabon units by selective hydrogenation of the preformed block copolymer. The object of the hydrogenation is to improve the environmental resistance of the olefinically unsaturated block copolymer, particularly its resistance to light, oxygen, ozone, and heat. The thermoplastic elastomeric block copolymers useful in the present invention are at least partially selectively hydrogenated as described in U.S. Pat. No. 3,810,957, which is hereby incorporated by reference.

The thermoplastic elastomers useful in the present invention comprise generally from about 5 to about 50, typically from about 10 to about 40, and preferably from about 15 to about 35% by weight monovinyl or alpha alkyl monovinyl arenes and generally from about 50 to about 95, typically from about 60 to about 90, and preferably from about 65 to about 85% by weight conjugated diene which is either substantially unhydrogenated or at least partially hydrogenated.

When the amount of monovinyl arene is greater than about 50% by weight, the thermoplastic elastomer becomes less rubbery and more plastic. Thus, as will be discussed in greater detail hereinbelow, such a thermoplastic elastomer may provide reduced glass fragment retention when applied to a bottle. When the amount of monovinyl arene is less than about 5% by weight, the final powder composition becomes more tacky, is essentially an unvulcanized rubber, and may have reduced adhesion to glass containers such as glass bottles.

The monovinyl arene or alpha alkyl monovinyl arene useful as the aromatic block of the thermoplastic elastomer includes styrenes, alpha alkyl styrenes, ring alkylated styrenes, such as vinyl toluene and t-butyl styrene, alpha, alpha dialkyl styrenes, ring halogenated styrenes such as the chlorostyrenes, vinyl naphthalenes and the like or mixtures thereof. Styrene and alpha methyl styrene are preferred.

These arene monomers may contain minor proportions, based on the arene, of copolymerizable monomers that have conjugated double bonds such as conjugated dienes, vinyl pyridines, and the like.

The conjugated dienes useful in preparing the thermoplastic elastomer include butadiene, alkyl substituted butadienes such as isoprene, 2,3-dimethyl butadiene, ethyl butadiene, methyl pentadiene, (piperylene) and the like, or mixtures thereof. The alpha, gamma conjugated butadienes are preferred. Unsubstituted alpha, gamma butadiene is particularly preferred.

The conjugated diene blocks also include diene copolymers containing up to 35% by weight in block B of a monovinyl arene such as styrene or alpha methyl styrene distributed therein in a non-block, i.e., random or tapered configuration.

A typical, but by no means exhaustive, list of suitable block polymers includes the following:
Polystyrene-polybutadiene-polystyrene,
Polystyrene-polyisoprene-polystyrene,
Polystyrene-polybutadiene (polybutadiene-polystyrene)2-5,
Polystyrene-(polyisoprene-polystyrene)2-5,
Polystyrene-poly(ethyl-butadiene)-polystyrene,
Polystyrene-poly(random butadiene-styrene)-polystyrene, Poly(alpha-methylstyrene)-polybutadiene-poly(alpha-methylstyrene), Poly(alpha-methylstyrene)-polyisoprene-poly(alphamethylstyrene), Poly(styrene-alpha-methylstyrene)-poly(butadieneisoprene) (styrene-alpha-methylstyrene), and Poly(vinylxylene)-polybutadiene-poly(vinylxylene).

The number average molecular weight of the thermoplastic elastomers useful in the present invention may be generally from about 15,000 to about 150,000, typically from about 30,000 to about 100,000, and preferably from about 50,000 to about 80,000. In general, the higher the number average molecular weight of the thermoplastic elastomer, the poorer its melt flow. However, the amount of monovinyl arene in the thermoplastic elastomer has a more significant effect on melt flow than the number average molecular weight of the thermoplastic elastomer.

The conjugated diene portion of the thermoplastic elastomer may be hydrogenated to any degree including substantially complete saturation whereas the aromatic portion is left substantially unhydrogenated; e.g., less than 5%, preferably less than 2% hydrogenated. The conjugated diene portions of the thermoplastic elastomers useful in the present invention are hydrogenated to generally at least about 10%, typically at least about 50%, and preferably at least about 98%. Substantially complete hydrogenation of the conjugated diene portion is preferred.

Thermoplastic elastomers which are at least partially hydrogenated are preferred for use in the present invention since these polymers have improved ultra violet light exposure stability, improved outdoor weatherability, and improved thermal stability. Also, unexpectedly, those polymers which are at least partially hydrogenated do not "blush" or absorb water when in contact with a caustic solution to the same extent as do those polymers which are not at least partially hydrogenated. By "blush" is meant that the coating acquires some degree of opaqqueness when in contact with an aqueous solution.

The melt flow modifier useful in the present invention may be selected from the group consisting of monovinyl arene homopolymers, alpha alkyl monovinyl arene homopolymers, and copolymers of monovinyl arenes and alpha alkyl monovinyl arenes either with each other or with other comonomers. These modifiers must be at least partially hydrogenated. Copolymers of monovinyl arenes and alpha alkyl monovinyl arenes either with each other or with other comonomers are preferred. Copolymers of these compounds with each other are particularly preferred. Copolymers of monovinyl arenes and alpha alkyl monovinyl arenes which are not hydrogenated are described in U.S. Pat. No. 3,932,332 which is hereby incorporated by reference.

The monovinyl arenes useful in preparing the melt flow modifier include styrene, ring alkylated styrenes such as vinyl toluene and t-butyl styrene, vinyl naphthalenes, ring halogenated styrenes such as the chlorostyrenes, and the like and mixtures thereof. Styrene is a preferred monovinyl arene.

The alpha alkyl monovinyl arenes useful in preparing the melt flow modifier include alpha methyl styrene, ring alkylated alpha methyl styrenes, alpha, alpha dialkyl styrenes, and the like and mixtures thereof. Alpha methyl styrene is a preferred alpha alkyl monovinyl arene.

Minor amounts of other monomers, i.e., generally less than about 50, typically less than about 25, and preferably less than about 10% by weight of the copolymers may also be incorporated within the copolymer. Such monomers include non-cyclic aliphatic compounds.

When a copolymer comprising substantially only monovinyl arenes and alpha alkyl monovinyl arenes is used as the melt flow modifier, the copolymer contains generally from about 10 to about 50, typically from about 15 to about 35, and preferably from about 20 to about 30% by weight monovinyl arene, and generally from about 50 to about 90, typically from about 65 to about 85, and preferably from about 70 to about 80% by weight alpha alkyl monovinyl arene. A particularly preferred copolymer comprising substantially only monovinyl arenes and alpha alkyl monovinyl arenes is a copolymer of styrene and alpha methyl styrene.

Not all compounds which are generally known to influence the melt flow of a polymer are useful in the present invention. For example, many compounds which have significant effects on the melt flow of polymers such as thermoplastic elastomers discolor at the temperature at which the compositions of the present invention must be raised to have satisfactory melt flow.

Many compounds could not be used as melt flow modifiers in combination with the thermoplastic elastomer because such compositions would not have satisfactory melt flow. For example, compositions which have a melt index less than about 2.0 grams per ten minutes at 200° C. do not have satisfactory melt flow. (For details of the melt index test, see ASTM D-1238.) Even some of those compositions which have a melt index greater than about 2.0 grams per 10 minutes at 200° C. are not useful in the present invention since in the melt index test, there is a force which pushes the material through an orifice whereas when powders are melted on a substrate, no force is applied to the molten powder particles. Thus, the compounds useful as melt flow modifiers in the present invention must result in a final composition having sufficient melt flow under zero shear conditions.

Some compounds will form a mixture with the thermoplastic elastomer which has a melt index greater than 2.0 but are not compatible with the thermoplastic elastomer and thus result in opaque compositions. Others are compatible but do not provide enough plasticization to the phases to allow them to flow under zero shear. Finally, some compounds which are otherwise acceptable as melt flow modifiers are not useful in compositions used to coat glass bottles because they do not provide compositions which possess sufficient fragment retention.

Unlike the copolymers described in U.S. Pat. No. 3,932,332, the polymers useful as the melt flow modifiers in the present invention must be at least partially hydrogenated, i.e., at least part of the arene nuclei must be saturated. If the arene nucleus is benzene, the hydrogenated product would thus be cyclohexane. The melt flow modifiers of the present invention are generally at least about 20, typically at least 25, and preferably from about 30 to about 90% hydrogenated.

A preferred copolymer of styrene and alpha methyl styrene is a random copolymer which is at least 20% hydrogenated.

Preferred melt flow modifiers for use in the present invention include the Hercules XPS series. Hercules XPS 313 polymer is a random copolymer comprising 25% styrene and 75% alpha methyl styrene. This copolymer is about 35% hydrogenated, has a softening point range between 42° and 62° C., has a number average molecular weight of 738, a weight average molecular weight of 1230, and a molecular weight distribution of 1.7. Hercules XPS 541 polymer is a random copolymer comprising 25% styrene and 75% alpha methyl styrene. This copolymer is about 65% hydrogenated, has a softening point range between 45° and 65° C., has a number average molecular weight of 725, a weight average molecular weight of 1120, and a molecular weight distribution of 1.5. Hercules XPS 651 polymer is a random copolymer comprising 25% styrene and 75% alpha methyl styrene. This copolymer is about 65% hydrogenated, has a softening point range between 20° and 40° C., has a number average molecular weight of 410, a weight average molecular weight of 950, and a molecular weight distribution of 2.5. Hercules XPS 657 polymer is a random copolymer comprising 25% styrene and 75% alpha methyl styrene. This copolymer is about 100% hydrogenated, and has a softening point range between 31° and 51° C. Mixtures of two or more melt flow modifiers may also be used although certain mixtures of such modifiers tend to produce a certain haziness in the final coating. For example, the use of a mixture of Hercules XPS 657 and Hercules XPS 651 modifiers results in a hazy coating.

By solubility parameter is meant the square root of the cohesive energy density. For a detailed discussion of this term, see "Polymer Handbook" Section IV, pp. 341-68 by Brandrup, J & Immergut, E. H. (Interscience Division of John Wiley & Sons, N.Y., N.Y., 1966). The melt flow modifiers useful in the present invention may be chosen on the basis of their solubility parameters. The preferred melt flow modifier for a particular thermoplastic elastomer should have a solubility parameter between the solubility parameter of the aromatic portion and the conjugated diene or saturated diene portion of the thermoplastic elastomer. For example, a particularly preferred thermoplastic elastomer comprises 80% by weight substantially totally hydrogenated butadiene (having a solubility parameter of about 8) and 20% by weight styrene (having a solubility parameter of about 9). When this particularly preferred thermoplastic elastomer is employed, the melt flow modifier should have a solubility parameter of generally from about 6 to about 11, typically from about 7 to about 10, and preferably from about 8 to about 9.

In the present invention there is employed generally from about 25 to about 90, typically from about 45 to about 75, and preferably from about 50 to about 70% by weight thermoplastic elastomer and generally from about 10 to about 75, typically from about 25 to about 55, and preferably from about 30 to about 50% by weight melt flow modifier.

The required amount of melt flow modifier needed to provide sufficient melt flow depends upon the percentage of aromatic rings in the thermoplastic elastomer moiety. For example, when a thermoplastic elastomer comprising styrene and hydrogenated butadiene is employed, less melt flow modifier is needed to get sufficient flow when there is more hydrogenated butadiene. Thus, if the thermoplastic elastomer contains 70% hydrogenated butadiene and 30% styrene, it has been found that about 50% by weight of Hercules XPS 541 copolymer is needed for sufficient flow whereas when the thermoplastic elastomer contains 80% hydrogenated butadiene and 20% styrene, only about 40% by weight Hercules XPS 541 copolymer is needed.

It has also been found that as the percentage of melt flow modifier increases, the poorer the glass fragment retention of the powder composition as noted hereinabove. To decrease the amount of melt flow modifier needed, a thermoplastic elastomer having an increased amount of conjugated diene may be used. However, it has been noted that as the amount of conjugated diene relative to monovinyl arene increases, the final powder composition becomes more tacky and less stable during cryogenic grinding.

The melt flow modifier useful in the present invention must contain aromatic portions which are at least partially hydrogenated in order that the melt flow modifier will be compatible with both the aromatic and aliphatic portions of the thermoplastic elastomers. The aromatic portion of the melt flow modifier is compatible with the aromatic portion of the thermoplastic elastomer and the hydrogenated or saturated portion of the melt flow modifier is compatible with the aliphatic portion of the thermoplastic elastomer.

The amount of melt flow modifier that should be incorporated within the powder composition depends on several factors. For example, the higher the temperature of the oven during flow out of the powder composition, the less melt flow modifier needed. The greater the amount of monovinyl arene in the thermoplastic elastomer, the more melt flow modifier needed. The higher the molecular weight of the thermoplastic elastomer, the more flow modifier required. The higher the percentage of hydrogenation of the melt flow modifier, the smaller the amount of the melt flow modifier needed. The higher the molecular weight of the melt flow modifier, the larger the amount of melt flow modifier required.

The present invention also requires the addition of at least one adhesion promoter.

The adhesion promoters useful in the present invention are preferably silanes but, in the broadest aspect of the present invention, adhesion promoters such as titanates, isocyanates, epoxies, phenoxies, or others known to those skilled in the art may be employed. The preferred adhesion promoters are substituted silanes or their corresponding silanols (i.e., the partially or fully hydrolyzed derivative of the silane) or the corresponding siloxanes (the polymeric form of the silanol) or mixtures of the silane, silanol and siloxane. The silane has the general formula:

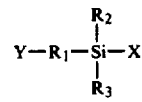

wherein Y is selected from the group consisting of mercapto, epoxy, amino, polymeric amino, methacryloxy, n-alkyls, aryls, halogenated derivatives of the foregoing and mixtures thereof: $R_1$ is selected from the group consisting of alkylene, isoalkylene, and cycloalkylene, each of 2 to 16 carbon atoms; X is selected from the group consisting of a halogen, hydroxyl, alkoxy, and acyloxy group; $R_2$ and $R_3$ are selected independently from the group consisting of $Y-R_1-$, $X-$, and methyl. The $R_1$ group may also contain more than one substituent group so long as no single carbon atom holds more than one such group. Condensation products of the substituted alkyl silanes are also applicable.

Illustrative of suitable silanes within this structural formula are: gamma-glycidoxypropyl trimethoxysilane, beta-(3,4-epoxycyclohexyl)ethyl trimethoxysilane, beta-glycidoxyethyl triethoxysilane, beta-(3,4-epoxycyclohexyl) ethyl tri(beta-methoxyethoxy) silane, beta-(3-epoxyethylphenyl) ethyl trimethoxysilane, gamma-glycidoxypropyl dimethyl methoxy-silane, beta-(epoxyethyl) ethyl triethoxysilane, 4,5-epoxy-n-hexyl trimethoxysilane, 7,8-epoxy-n-octyl tripropoxysilane, 15,16-epoxy-n-hexadecyl trimethoxysilane, 3-methylene-7-methyl-6,7-epoxyoctyl trimethoxysilane, and their corresponding silanols and siloxanes; the mercapto alkyl silanes such as beta-mercaptoethyl trimethoxysilane, beta-mercaptopropyl trimethoxysilane, beta-(2-mercaptocyclohexyl) ethyl trimethoxysilane, beta-mercaptoethyl triethoxysilane, gamma-mercaptopropyl dimethyl methoxy-silane, beta-mercaptoethyl triacetoxysilane, and their corresponding silanols and siloxanes.

The adhesion promoters may generally be added to the melt in liquid form, i.e., in 100% concentration or as a dispersion in water, in $C_4$-$C_{16}$ hydrocarbon solvents such as pentane, hexane, heptane, benzene, toluene, xylene, etc., or in organic solvents such as $C_2$-$C_6$ alkanols (e.g., isopropyl alcohol, sec.-butyl alcohol, etc.) $C_3$-$C_8$ ketones (e.g. acetone, methylethyl ketone, etc.) and chlorinated alkanes such as carbon tetrachloride, chloroform and ethylene dichloride. For the purpose of convenience herein and in the appended claims, the term "silane" will be understood to include the unhydrolyzed form (i.e., the silane), the partially or fully hydrolyzed form (i.e., the silanol), the condensation products resulting from the partially or fully hydrolyzed form of the silane (i.e., the siloxane, also known as polysiloxane), and mixtures of the aforesaid forms.

A particularly preferred adhesion promotor is gamma-glycidoxypropyl-trimethoxy silane. A mixture of two or more adhesion promoters may also be used.

The total amount of adhesion promotor may be incorporated within the tacky powder particles. However, some of the total amount of adhesion promoter is preferably incorporated within the small hard non-tacky particles which are surface deposited on the tacky particles. Thus, in such an embodiment, part of the adhesion promoter may be incoporated in the tacky powder particles and part in the small, hard non-tacky powder particles. Alternatively, the non-tacky powder composition may be slurried in a dispersion of an adhesion promoter such as a silane in a suitable volatile solvent followed by evaporation of the solvent. The non-tacky powder composition is then coated with the adhesion promoter.

Finally, if the final powder composition is to be applied to a glass container, part or all of the adhesion promoter may be applied as a primer coat directly to the glass container itself.

The incorporation of at least part of the adhesion promoter in the tacky powder particles is preferred. Particularly preferred is the incorporation of part of the adhesion promoter in the tacky powder particles and the remainder of the adhesion promoter is incorporated with the small, hard non-tacky particles.

The amount of adhesion promoter useful in the present invention is generally from about 0.1 to about 10% by weight of the entire powder composition. When the preferred silane adhesion promoters are employed, the amount of silane is generally from about 0.1 to about 8, typically from about 1 to about 6, and preferably from about 2 to about 5% by weight based upon the weight of the total composition.

The upper limit of this amount is determined by economic considerations and also by the fact that too large an amount of adhesion promoter might be incompatible with the rest of the powder composition and result in some degree of haziness.

Stabilizers may also be used in the composition of the present invention especially if the coated article is to have a long life. For example, a stabilizer against oxidation during heating and aging and stabilizers against weathering (U.V. stabilizers) may be added in amounts of generally less than about 10, typically from about 0.5 to about 5, and preferably from about 1 to 3% by weight of the entire powder composition.

Such stabilizers are known to those skilled in the art and include Uvinul 400 2,4-dihydroxy-benzophenone, Tinuvin 326 substituted hydroxyphenyl benzotriazole, Tinuvin P substituted benzotriazole, Permasorb MA 2-hydroxy-4-(2-hydroxy-3-methacryloxy) propiobenzophenone, Eastman OPS octylphenyl salicylate, Eastman RMB resorcinol monobenzoate, Antioxidant 330 1,3,5-trimethyl-2,4,6-tris(3,5-ditert-butyl-4-hydroxybenzyl) benzene, Irganoz 1076 octadecyl 3-(3,5-ditert-butyl-4-hydroxyphenyl) propionate, Irganox 1010 tetrabis methylene 3-(3,5-ditert-butyl-4 hydroxyphenyl)-propionate methane, Irganox 565 2(4-hydroxy-3,5-tertiary butyl anilino)4,6-bis (n-octyl thio) 1,3,5-triazine, Butazate zinc dibutyldithiocarbamate, Plastanox 2246 2,2-methylene-bis(4-methyl-6-tertiary butyl phenol), Plastanox 425 2,2'-methylene bis(4-ethyl-6-tert-butyl phenol), Santowhite Crystals 4,4-thiobis(6-tertiary-butyl m-cresol), Polygard tri(nonylated phenyl) phosphite, NBC nickel dibutyl dithiocarbamate, and Pennzone B dibutyl thiourea. A preferred stabilizer for use as an antioxidant during heating and aging in Irganox 1010.

Mixtures of two or more of these stabilizers may also be used.

The non-tacky powder composition useful in the present invention may be prepared by a method which is described in detail in United States Patent Application Ser. No. 844,812, entitled "Powder Composition and Method of Preparation," and filed concurrently herewith by Martin J. Hannon and Richard K. Greene. This application discloses that the powder composition may be prepared by first melt blending a first composition comprising the thermoplastic elastomer and melt flow modifier. This melt blending step may take place in any apparatus known to those skilled in this art. Such apparatus include a Brabender Plastograph and a Werner Pfleiderer ZKS twin screw melt extruder.

This melt blending step must be carried out at a temperature which is high enough to provide sufficient flow while the composition is molten but low enough so that the composition does not discolor. Such temperatures are generally from about 100 to about 250 typically from about 120 to about 200, and preferably from about 130 to about 160.

The thermoplastic elastomers useful in the present invention appear to have a critical temperature for breakup of the domains within the polymer. This critical temperature is believed to be a function of the molecular weight of the two segments, the chemical composition and differential solubility parameter between the two phases.

The molten composition must next be cooled until it solidifies. Cooling may be done in air or by passing the molten material through a water bath. When a silane is used as an adhesion promoter in the present invention, the molten composition is preferably air cooled. Water contact with the silane should be kept to a minimum since water appears to affect the adhesion properties of the silane.

The solid composition is then pelletized and the pellets are ground to desired particle size.

The particles may be ground by using any apparatus known to those skilled in this art. Such apparatus include the Micropul pulverizer, an Abbe mill, a Wiley mill and pin mills.

The powder particles prepared according to this process are tacky and tend to agglomerate thus making spraying difficult. To solve the tackiness problem, the powder particles are dry blended with at least one of the melt flow modifiers described hereinabove with the provision that this melt flow modifier must itself be non-tacky, i.e., it must have a glass transition temperature of generally at least about 20, typically at least about 30, and preferably at least about 40° C.

The term "glass transition temperature" as used in this application means the temperature at which the melt flow modifier changes from a brittle, vitreous state to a plastic state.

When the tacky powder particles are dry blended with the non-tacky particles, the non-tacky particles adhere to the surface of the tacky particles in a non-continuous layer to form composite powder particles which do not agglomerate.

The powder composition of the present invention comprises generally from about 3 to about 20, typically from about 5 to about 15, and preferably from about 8 to about 12% of the small, hard, non-tacky particles comprising the adhesion promoter, and generally from about 80 to about 97, typically from about 85 to about 95, and preferably from about 88 to about 92% by weight of the tacky powder particles.

The non-tacky particles comprising the adhesion promoter having a glass transition temperature greater than about 20° C. may additionally contain incorporated therein part of the adhesion promoter as described hereinabove. Thus, the non-tacky powder particles comprise generally from about 90 to about 100, typically from about 94 to about 98, and preferably from about 95 to about 97% by weight melt flow modifier and generally from about 0 to about 10, typically from about 2 to about 6, and preferably from about 3 to about 5% by weight adhesion promoter.

As noted hereinabove, part of the adhesion promoter may be added as a primer coat directly to the surface to be coated rather than including it within the powder particles Alternatively, instead of incorporating all of the adhesion promoter within the particle or applying part of the adhesion promoter as a primer coat, part of the adhesion promoter may be applied as a film surrounding the final powder particle. This film increases the adhesion of the particles to the bottle surface. Combinations of these methods may also be used.

If a mixture of a melt flow modifier and an adhesion promoter is used to form the non-tacky powder particles, this mixture is first melt blended in any apparatus known to those skilled in this art such as a Brabender Plastograph or a single screw compounding extruder such as a Prodex single screw compounding extruder, or a Baker-Perkins MP mixing extruder or a Werner Pfleiderer ZSK twin screw melt extruder. This extrudate is then cooled in air or water to form a solid composition. This solid composition is then formed into a powder using apparatus known to those skilled in this art. Such apparatus include a knife edge chopping mill such as Cumberland knife edge chopping mill or an impact mill such as a Micropul impact pulverizer.

This second powder composition is then dry blended with the first powder composition by any means known to those skilled in this art. The blended powders are then comminuted into a fine powder at temperatures below the embrittlement temperature of the B block portion of the thermoplastic elastomer. The dry blended powder composition may, for example, be added to a Micropul impact pulverizer where the powders are ground using liquid nitrogen as a cooling medium.

The non-tacky powder particles, comprising the melt flow modifier and possibly the adhesion promoter, and the tacky powder particles may be first dry blended and then comminuted, or preferably, they may be dry blended and comminuted simultaneously by, for example, dry blending the two kinds of particles in a Micropul impact pulverizer.

Since the embrittlement temperature of the thermoplastic elastomer is generally less than about $-30°$, typically less than about $-100°$, and preferably less than about $-125°$ C., the powder mixture should be comminuted at temperatures generally less than about $-30$, typically less than about $-100$, and preferably less than about $-125°$ C.

The particle size of this powder composition may be generally from about 50 to about 300, typically from about 75 to about 250, and preferably from about 100 to about 200 micrometers. The lower limit of particle size is based principally upon the economics of low temperature grinding whereas the upper limit is set because of the need to achieve smooth coating and ease of application with finer powders.

The present process may be carried out in a batch, continuous, or semi-continuous manner as described.

The powder particles produced according to the present invention are generally useful in any application where good melt flow is needed under zero shear conditions. Such applications include roto-casting and coating of containers, particularly glass bottles. This latter utility is described in United States Patent Application Ser. No. 844,963, entitled "Powder Composition and Method of Preparation," filed concurrently herewith by Martin J. Hannon and Alex S. Forschirm. This utility is also disclosed in United Stated Patent Application Ser. No. 844,812, entitled "Coated Bottle and Method of Coating," filed concurrently herewith by Martin J. Hannon and Richard K. Greene. The disclosures of these two patent applications are hereby incorporated by reference.

Although the powder particles thus produced are generally useful in any application where good melt flow is needed under zero shear conditions, they are particularly useful for coating glass bottles to render them fragment retentive and reusable.

The first coating of powder particles is applied to a glass container such as a glass bottle which is preferably clean and dry. The bottle may be coated with a lubricity size. Such sizes are well known to those skilled in this art. They include polyethylene, tin compounds, and titanium compounds.

The surface of the bottle to be sprayed may be vigorously scrubbed with a warm water solution containing Micro cleaning agent. The bottle may then be thoroughly rinsed with warm tap water and then followed with an acetone rinse to remove the water. The bottles are then air dried.

The powder particles which are used for the basecoat should also be thoroughly dried before use. The powder particles are preferably dried for about ten hours in a vacuum oven at about room temperature.

The powder particles may be applied by any means known to those skilled in this art. For example, the powder particles may be applied by electrostatic spraying, fluidized bed or as a water dispersion. Electrostatic spraying is preferred and the following description of the coating process involves the use of electrostatic spraying.

The bottles are first placed in an oven for the purpose of preheating. The temperature used in the preheat oven depends upon the composition of the powder particles that will be sprayed. Temperatures generally from about 100° to about 350°, typically from about 125° to about 300°, and preferably from about 150° to about 180° C., may be employed.

The amount of time the bottles are in the preheat oven also depends upon the composition of the powder particles that will be sprayed onto the bottles. Residence times of generally from about 0.5 to about 40, typically from about 5 to about 15, and preferably from about 10 to about 20 minutes may be employed.

Any electrostatic spraying device known to those skilled in this art may be employed to spray the powder particles. Such devices include a Gema electrostatic spraying gun, a DeVilbiss electrostatic spraying gun, and a Nordson electrostatic spraying gun.

While the powder particles are being sprayed onto the container, the container may be gently turned by a low speed stirring motor. When the container is sufficiently coated with the powder particles, it is removed for baking. At this point, the preheated container still looks white and powdery. It is fused but not melted at this point.

The pressure which is required to feed the powder particles through the electrostatic spraying gun is dependent upon the stability rating of the powder particles. The powder particle stability rating is a qualitative rating and ranges from 1 to 5 with a powder having a rating of 1 defined as a free flowing powder having no lumps and capable of being stored without agglomeration. A powder having a rating of 2 is defined as one which has lumps which can be broken up with mild agitation. A powder having a rating of 3 is defined as one which has lumps which can be broken up only with violent agitation. A powder having a rating of 4 is defined as one which contains large lumps which cannot be broken up even with violent agitation. A powder having a rating of 5 is defined as a completely coalesced lump of polymer.

The powder particles of the present invention have powder stability ratings of generally less than about 3.0, typically less than about 2.0, and preferably less than about 1.5.

When the powder stability rating approaches 1, the pressure within the electrostatic spray gun is relatively uniform whereas when the powder stability rating approaches 5, the pressure within the feed system fluctuates due to the blocking caused by the larger particles.

After being sprayed, the glass bottle is placed in an oven which is at a temperature of generally from about 180° to about 300°, typically from about 200° to about 240°, and preferably from about 215° to about 235° C. for generally from about 1 to about 40, typically from about 10 to about 30, and preferably from about 15 to about 25 minutes.

The bottle is then preferably removed from the oven and allowed to air cool to room temperature. The weight of powder particle that is coated on the glass bottle is generally at least about 6 typically at least about 12, and preferably at least about 15 grams in order to achieve a glass fragment retention of at least about 90% on a 64 fluid ounce bottle which weighs approximately 830 grams.

The amount of powder composition needed to achieve a particular glass fragment retention level varies with the kind of thermoplastic used as well as with the relative amounts of thermoplastic elastomer and melt flow modifier.

The bottle is then again preheated in preparation for the application of the second or topcoat coating. The coating is preheated at an oven temperature of generally from about 60° to about 350°, typically from about 80° to about 300°, and preferably from about 100° to about 120° C. for generally from about 0.5 to about 30, typically from about 5 to about 25, and preferably from about 10 to about 20 minutes.

The topcoat comprises at least one synthetic resin. The synthetic resins useful in the present invention are selected from those having abrasion resistance, wet and dry scratch resistance, chemical resistance, oil resistance, weather resistance and clarity. Such resins include epoxy resins, polyurethanes, polycarbonates, polyesters, polystyrenes, cellulosic resins such as cellulose acetate, and cellulose nitrate, polyvinyl chloride, polyamides, fluorocarbons, acrylic homopolymers and copolymers.

Acrylic homopolymers and copolymers are preferred for use in the present invention. The term acrylic resin as used herein includes any polymer, whether thermosetting or thermoplastic, which is prepared by the free-radical addition polymerization of one or more ethylenically unsaturated monomers, at least 40 weight percent of which is selected from the group consisting of acrylic and methacrylic acid, alkyl, cycloalkyl, and aralkyl esters of acrylic and methacrylic acids, wherein the ester moiety contains from 1 to about 18 carbon atoms, and the hydroxyalkyl esters of acrylic and methacrylic acids, wherein the hydroxyalkyl moiety contains from 2 to about 10 carbon atoms.

Examples of suitable alkyl, cycloalkyl, aralkyl, and hydroxyalkyl esters of acrylic and methacrylic acids include, among others, methyl acrylate, ethyl acrylate, isopropyl acrylate, n-butyl acrylate, t-butyl acrylate, 2-ethylhexyl acrylate, dodecyl acrylate, octadecyl acrylate, methyl methacrylate, n-butyl methacrylate, 2-ethylhexyl methacrylate, octyl methacrylate, tridecyl methacrylate, hexadecyl methacrylate, cyclohexyl acrylate, cyclohexyl methacrylate, benzyl acrylate, benzyl methacrylate, isobornyl acrylate, isobornyl methacrylate, beta-hydroxyethyl acrylate, beta-hydroxyethyl methacrylate, beta-hydroxypropyl acrylate, beta-hydroxypropyl methacrylate, gamma-hydroxypropyl methacrylate, beta-hydroxybutyl acrylate, gamma-hydroxybutyl methacrylate, delta-hydroxybutyl acrylate, beta-hydroxyoctyl acrylate, and beta-hydroxydecyl methacrylate.

The remaining 60 weight percent or less of said ethylenically unsaturated monomers consists of at least one monomer selected from the group consisting of:

(1) acrylic monomers other than those cited hereinabove, which monomers generally encompass aryl and reactive esters of acrylic and methacrylic acids, such as phenyl acrylate, phenyl methacrylate, aziridinyl acrylate, glycidyl methacrylate, 2-aminoethyl acrylate, 2-aminopropyl methacrylate, 3-aminopropyl methacrylate, and the like;

(2) ethacrylic and crotonic acids and esters thereof, such as ethyl ethacrylate, methyl crotonate, octyl ethacrylate, heptyl crotonate, octadecyl ethacrylate, cyclohexyl ethacrylate, benzyl crotonate, phenyl ethacrylate, and the like;

(3) amides, alkylol amides, and alkoxyalkyl amides of acrylic, methacrylic, and crotonic acids, wherein the alkyl moieties contain from 1 to about 4 carbon atoms and the alkoxy moiety contains from 1 to about 8 carbon atoms, specific examples being acrylamide, methacrylamide, crotonamide, methylol acrylamide, methoxymethyl methacrylamide, butoxymethyl acrylamide, 2-ethylhexoxymethyl methacrylamide, diacetone acrylamide, and the like;

(4) alpha, beta-ethylenically-unsaturated dicarboxylic acids and anhydrides, such as maleic acid, maleic anhydride, fumaric acid, itaconic acid, mesaconic acid, and the like;

(5) mono- and diesters of alpha, beta-ethylenically-unsaturated dicarboxylic acids, examples of which esters are fumaric acid monoethyl ester, dimethyl itaconate, dipropyl mesaconate, diisopropyl maleate, dicyclohexyl maleate, maleic acid mono (beta-hydroxyethyl) esters, and the like;

(6) alpha, beta-ethylenically-unsaturated nitriles, such as acrylonitrile, methacrylonitrile, ethacrylonitrile, crotonic nitrile, and the like;

(7) vinyl aromatic compounds, such as styrene, vinyltoluene, vinylnaphthalene, chlorostyrene, bromostyrene, and the like;

(8) monounsaturated hydrocarbons, such as ethylene, propylene, and the like;

(9) no more than about 10 weight percent of vinyl esters of alphatic monocarboxylic acids having from 1 to about 18 carbon atoms, such as vinyl acetate, vinyl propionate, vinyl octanoate, vinyl stearate, and the like; and

(10) no more than about 10 weight percent of halogen-containing unsaturated hydrocarbons, such as vinyl chloride, vinyl fluoride, vinylidene chloride, vinylidene fluoride, and the like.

Celan acrylic polymers are particularly preferred for use in the present invention.

Mixtures of two or more synthetic resins may also be used as the topcoat as long as there results no deleterious effects on the product.

When the preferred thermoset acrylic polymers are used as the topcoat in the present invention, the acrylic powder particles include a curing agent for the acrylic polymer. There may be employed any curing agent which will cure or cross link the resin after it has been applied to the coated surface. Such curing agents are not activated until a certain critical minimum temperature is reached, but which, at that minimum temperature, and at temperatures in excess of that minimum, is activated so as to cure or cross link the acrylic resin.

Typical curing agents include multifunctional isocyanates such as toluene isocyanate, polyols, polycarboxylic acids, hydroxylcarboxylic acids, polyamines, hydroxylamines, and other compounds known to those skilled in this art.

One such curing agent comprises a blocked triisocyante, prepared by reacting three moles of 1-isocyanato-3-isocyanatomethyl-3,5,5,-trimethylcyclohexane with one mole of 1,1,1-tris(hydroxymethyl) propane in methyl isobutyl ketone followed by blocking with methyl ethyl ketoxime.

A preferred curing agent is Hylene curing agent which comprises methylene bis cyclohexyl diisocyanate blocked with caprolactam.

The curing agent may be present in small amounts, generally from about 20 to about 50, typically from about 25 to about 45, and preferably from about 30 to about 40% by weight of the synthetic resin and curing agent.

A curing agent may be desirable with synthetic resins other than acrylics as is well known to those skilled in this art.

The synthetic resin topcoat may be applied by any method known to those skilled in this art. For example, the topcoat may be applied as a solution or as a dispersion of the synthetic resin in an appropriate solvent or liquid.

Alternatively, the synthetic resin topcoat can be applied as a powder. The topcoat can be applied by a spraying or a dipping technique.

The topcoat may contain generally less than about 10, typically from about 0.5 to about 5, and preferably from about 1 to about 3% by weight of the stabilizers against oxidation and ultraviolet light.

The bottle is then heated in a baking oven which is at a temperature of generally from about 150° to about 350°, typically from 160° to about 300°, and preferably from about 175° to about 200° C. for generally from about 0.5 to about 30, typically from about 5 to about 25, and preferably from about 15 to about 20 minutes. The temperature must be such as to allow the topcoat to flow out and/or cure. Thus, the temperature must be high enough to activate the curing agent and the heating must be for a time sufficient to effect substantially complete curing.

The bottle is then cooled to substantially ambient temperatures. These bottles are then found to be both fragment retentive and reusable.

Bottles coated with the compositions of the present invention are fragment retentive. By "fragment retentive" is meant that there is a certain degree of glass retention when a filled glass bottle is dropped according to the following test procedure. The test bottles are weighed and then filled with 0.1 molar citric acid/water solution from a stock solution.

Three and six-tenths percent of the volume is displaced with a stainless steel plug of exact size so as to leave a 3.6% headspace when removed. Then 0.4 grams/fluid ounce of Lilly OSP 650 mg. sodium bicarbonate tablets are added to the bottles. The bottle is immediately capped and allowed to equilibrate overnight at 72° C. The bottles should have a pressure of approximately 60 psi as tested by a Zahm and Nagel model DT piercing device.

The pressurized bottles are then tested for fragment retention in a bottle drop chamber. The bottle drop chamber comprises a platform on an electrically operated lift with a calibrated height control and a remote electrical platform release. The platform is centered over a heavy stainless steel plate approximately three square feet which is set in concrete. The chamber is enclosed for safety with heavy rubberized fabric and a Plexiglass observation panel.

The pressurized bottles are placed sideways on the drop platform at a height of 4 feet, the chamber is closed, and the platform released. All pieces of glass within a 3 foot diameter circle are collected, dried and weighed. The ratio of the final weight of the glass pieces divided by the original bottle weight, expressed as a percentage, is the percentage retention.

The glass bottles coated with the powder composition of the present invention have glass fragment retention of generally at least about 50%, typically at least about 85, and preferably at least about 95%.

By "reusable" is meant that the bottle coating is not substantially removed or destroyed during the cleaning and sterilization procedures commonly employed by carbonated beverage bottling companies. Several tests may be designed to determine whether a particular coating is deemed capable of withstanding such procedures.

The coated bottles of the present invention are subjected to the following test. The coating of each bottle is slit through to the glass with a pointed razor edge knife such as an X-Acto knife. The coated bottle is then immersed in an aqueous solution comprising 4.5% by weight sodium hydroxide and 0.5% by weight sodium phosphate tribasic. This solution is maintained at 72° C. in a Nalgene insulated seven gallon tank. The tank has a thermostatically controlled electrical heater capable of maintaining the temperature at 72°±2° C.

The bottle is removed every hour and rinsed lightly with warm water. The slit is picked at with a fingernail to determine the adhesion of the coating to the glass. Then a few drops of a 50/50% by weight ethanol/water solution containing 1% by weight phenolphthalein is rubbed lightly into the slit to see if any of the sodium hydroxide solution has crept laterally under the coating from the slit. The coating is also observed for any signs of discoloration or haziness or any other signs of coating failure.

Coating failure is defined as either looseness of the coating or creepage of the sodium hydroxide solution. The longer the coated bottles can remain in the sodium hydroxide solution without deleterious results, the better these bottles will function as "returnable" bottles.

The coated bottles of the present invention can remain in the sodium hydroxide solution generally at least about 1, typically at least about 5, and preferably at least about 8 hours without any sign of substantial coating looseness or caustic creepage.

The present invention is further illustrated by the following examples. All parts and percentages in the examples as well as in the specification and claims are by weight unless otherwise specified.

EXAMPLE

A first composition comprising 2,945 grams of a Solprene thermoplastic elastomer having a number average molecular weight of 70,000, 1586 grams of Hercules XPS 541 random copolymer of 25% by weight styrene and 75% by weight alpha methylstyrene (approximately 65% hydrogenated), 181 grams of Union Carbide A187 gamma-glycidoxypropyl-trimethoxy silane and 91 grams of Irganox 1010 tetra-bis methylene 3-(3,5-ditertiary-butyl-4-hydroxyphenyl)-propionate methane are placed in a Werner-Pfleiderer ZSK twin screw melt extruder at 135° C. The thermoplastic elastomer comprises a block copolymer comprising 20% styrene having a number average molecular weight of 16,000 and 80% hydrogenated butadiene having a number average molecular weight of 60,000 wherein the styrene blocks are on the end of the polymer and the hydrogenated butadiene blocks are midblocks. The conjugated diene is substantially completely hydrogenated, i.e., more than about 98% of the double bonds are saturated. The hydrogenated butadiene midblock contains about 84% ethylene groups and about 16% butylene groups.

When the molten composition exits from the extruder it is air cooled to room temperature (about 25° C.) and then chopped into pellets having a length of about ⅛ inch and a diameter of about ⅛th inch.

A second composition comprising 512 grams of the Hercules XPS 541 polymer and 21.3 grams of Union Carbide A187 silane are separately melt blended in the extruder and then air cooled at room temperature. The solid composition is then broken into a powder using an Abbe knife chopping mill.

The pellets of the first composition and the powder of the second composition are then placed in a Micropul impact pulverizer and cryogenically ground using nitrogen at a temperature of about −190° C. The pellets are ground to a powder having a diameter of less than about 250 micrometers.

The final powder particles comprise a comparatively large tacky particle with comparatively smaller, hard, non-tacky particles adhering thereto. The larger particles contain the thermoplastic elastomer, melt flow modifier, adhesion promoter, and stabilizer. The smaller particles contain the melt flow modifier and the adhesion promoter.

The powder particles of the present invention are hard and non-tacky and do not coalesce even after 336 hours.

A 64 fluid ounce glass bottle is vigorously scrubbed with a warm water solution containing Micro cleaning agent. The bottle is then thoroughly rinsed with warm tap water and then followed with an acetone rinse to remove the water. The bottles are air dried and then placed in a forced convection oven which is preheated to about 150° C. for about 15 minutes.

The powder particles which are used for the basecoat are preferably dried for about ten hours in a vacuum oven at about room temperature. The powder particles are applied using a Germa electrostatic spraying gun. The electrostatic spraying equipment is thoroughly cleaned before use. The ovens used for baking the coated powder particles are stabilized at the appropriate temperature prior to spraying.

The bottle is then electrostatically sprayed with 40 to 50 grams of the powder particles prepared as described above. These powder particles are placed prior to spraying in a reservoir on the electrostatic spray gun.

While the powder particles are being sprayed onto the bottle, the bottle is gently turned by a low speed stirring motor. When the bottle is sufficiently coated with powder particles, it is removed for baking. At this point, the preheated bottle still looks white and powdery. It is fused but not melted.

After being sprayed, the bottle is placed in an oven which is at a temperature of 225° C. for 20 minutes.

The bottle is then removed from the oven and allowed to air cool to room temperature. The weight of powder particle that is coated on the glass bottle is 11.7 grams.

The bottle is then again preheated in preparation for the application of the second or topcoat coating. The coated bottle is preheated at a temperature of 115° C. for 15 minutes.

The topcoat is a Celan acrylic polymer which is electrostatically sprayed onto the bottle. The Celan acrylic polymer contains within it 28.3% by weight of a chai-nextended Hylene curing agent which comprises methylene bis cyclohexyl diisocyanate blocked with caprolactam.

The bottle is then cured in a baking oven which is at a temperature of 190° C. for 20 minutes. The bottle contains 19.8 grams of topcoat.

The coated bottle is then subjected to the following test. The coating of the bottle is slit through to the glass in two place with an X-Acto knife and the bottle is immersed in an aqueous solution comprising 4.5% by weight sodium hydroxide and 0.5% by weight sodium phosphate tribasic. This solution is maintained at 72° C. in a Nalgene insulated seven gallon tank. The tank has a thermostatically controlled electrical heater capable of maintaining the temperature at 72°±2° C.

The bottle is removed every hour and rinsed lightly with warm water. The slits are picked at with a fingernail to determine the adhesion of the coating to the glass. Then a few drops of a 50/50% by weight ethanol/water solution containing 1% by weight phenolphthalein is rubbed lightly into the slits to see if any of the sodium hydroxide solution has crept laterally under the coating from the slits. The coating is also observed for any signs of discoloration or haziness or any other signs of coating failure.

The coating around both slits does not have any sign of substantial coating looseness or caustic creepage for over 8 hours.

This bottle is found to have a fragment retention of 97.8%.

EXAMPLES 2-5

Example I is repeated with the exception of the differences noted in Table I. In Table I, "large particle" means the tacky particle before it is coated with the non-agglomerating agent. By "small particle" is meant the smaller particles used to keep the larger particles from agglomerating.

TABLE I

| Ex. No. | Powder Stability Rating | Large Particles (%) | | | | Small Particles (%) | | Film Appearance | Fragment Retention | Basecoat Wt. (g) | Topcoat Wt. (g) | Caustic Test[E] |
|---|---|---|---|---|---|---|---|---|---|---|---|---|
| | | T.E.[A] | M.F.M.[B] | A.P.[C] | Stab.[D] | M.F.M.[B] | A.P.[C] | | | | | |
| 2 | 1.2 | 58 | 31.2 | 3.8 | 1.9 | 4.8 | .2 | Slightly yellow | 99.4 | 14.4 | 18.2 | 8 (very slight creep) |
| 3 | 1.2 | 56.2 | 30.3 | 3.7 | 1.84 | 7.68 | .3 | Slightly yellow | 98.9 | 15.8 | 14.7 | 8 |
| 4 | 1.1 | 52.9 | 31.7 | 3.6 | 1.8 | 9.8 | .2 | Slightly yellow | 70 | 10.6 | 17.3 | 6 |
| 5 | 1.1 | 52.9 | 31.7 | 3.6 | 1.8 | 10.0 | 0 | Slightly yellow | 98 | 14.1 | 13.2 | 5 |

[A] = Thermoplastic Elastomer
[B] = Melt Flow Modifier
[C] = Adhesion Promoter
[D] = Stabilizer
[E] = Caustic Test: number of hours that the coated bottle (with the slit) can remain in the caustic solution without substantial loosening of the film or substantial creepage.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

We claim:

1. A glass container coated on its outer surface to prevent the scattering of glass fragments which comprises
   (A) a glass container,
   (B) an inner smooth non-particulate coating initially applied to (A) as non-tacky composite powder particles intimately contacted on the external wall surface of said container said composite powder particles comprising
      (a) tacky powder particles comprising a mixture of
         (1) a block copolymer which is either unhydrogenated or selectively hydrogenated to at least some degree and having at least two kinds of polymer blocks wherein one polymer block is designated by A and a second polymer block is designated by B such that prior to hydrogenation,
            (a) each A is a polymer end block of a monovinyl or alpha alkyl monovinyl arene having a number average molecular weight in the range of from about 5,000 to about 75,000, said blocks A comprising from about 5 to about 50% by weight of the total block copolymer, and
            (b) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 50 to about 95% by weight of the total block copolymer,
         (2) at least one melt flow modifier selected from the group consisting of
            (a) monovinyl arene homopolymers,
            (b) alpha alkyl monovinyl arene homopolymers, and
            (c) copolymers of monovinyl arenes and alpha alkyl monovinyl arenes, wherein the aromatic portions of the polymers described (2) (a), (b) and (c) are at least partially hydrogenated to remove the aromatic character thereof, and
         (3) at least one adhesion promoter, and
      (b) smaller solid particles, which are hard and non-tacky and which comprise at least one melt flow modifier of the group described in (a) (2) with the provision that the melt flow modifier have a glass transition temperature of at least about 20° C., adhering to the tacky surface of said tacky particles of (a) in a non-continuous layer, said composite powder particles being rendered in the configuration of a smooth non-particulate inner coating of the external surface of the glass container by heat and, (c) an outer top coat of a synthetic resin covering substantially the entire outer surface of said inner coat and a part of the external glass container surface and selected from the group consisting of epoxy resins, polyurethanes, polycarbonates, polyesters, polystyrenes, ethylene/vinyl acetate copolymers and acrylic homopolymers and copolymers wherein the outer film has high abrasion resistance, wet and dry scratch resistance, water resistance, chemical resistance, oil resistance, and weather resistance.

2. The glass container of claim 1, wherein said tacky powder particles of said non-tacky composite powder particles of (B) contain from about 25 to about 90% by weight of the block copolymer and from about 10 to about 75% by weight of the melt flow modifier.

3. The glass container of claim 1, wherein the block copolymer has a number average molecular weight of from about 15,000 to about 150,000.

4. The glass container of claim 1, wherein said tacky powder particles of said non-tacky composite powder particles of (B) contain from about 0.1 to about 8% by weight of an adhesion promoter selected from the group consisting of substituted silanes, the corresponding silanols, siloxanes, and mixtures thereof.

5. The glass container of claim 4, wherein said tacky powder particles of said non-tacky composite powder particles of (B) additionally contain less than about 10% by weight of at least one member of the group consisting of stabilizers against oxidation and stabilizers against ultraviolet light.

6. The glass container of claim 5, wherein said monovinyl arene portion of said block copolymer is styrene and wherein said conjugated diene portion of said block copolymer is unsubstituted alpha, gamma butadiene.

7. The glass container of claim 1, wherein said melt flow modifier is a partially hydrogenated copolymer consisting essentially of styrene and alpha methyl styrene.

8. The glass container of claim 7, wherein said copolymer of styrene and alpha methyl styrene is a random copolymer which is at least about 20% hydrogenated.

9. The glass container of claim 8, wherein said random copolymer of styrene and alpha methyl styrene comprises from about 10 to about 50% by weight styrene and from about 50 to about 90% by weight alpha methyl styrene.

10. The glass container of claim 5, wherein said adhesion promoter is gamma-glycidoxypropyl-trimethoxy silane and said stabilizer against oxidation is tetra-bis methylene 3-(3,5-ditert-butyl-4-hydroxyphenyl)propionate methane.

11. The glass container of claim 5, wherein said monovinyl arene is styrene, said conjugated diene is alpha, gamma butadiene, and said block copolymer is at least about 10% hydrogenated.

12. The glass container of claim 1, wherein the initial powder particle size of the composite powder particles of (B) is from about 50 to about 300 micrometers.

13. The glass container of claim 1 wherein said composite powder particles of (B) contain from about 3 to about 20% by weight of said small, hard, non-tacky particles.

14. The glass container of claim 13 wherein said small, hard, non-tacky particles may contain from about 0 to about 10% by weight of an adhesion promoter.

15. The glass container of claim 14 wherein said adhesion promoter is selected from the group consisting of substituted silanes, the corresponding silanols, siloxanes, and mixtures thereof.

16. The glass container of claim 1 wherein said block copolymer is selectively hydrogenated to at least some degree.

17. The glass container of claim 1 wherein said glass container is a pressurized glass bottle.

18. The glass container of claim 1 wherein said glass container has a glass fragment retention of at least about 50%.

19. The glass container of claim 1 wherein said outer coat comprises an acrylic homopolymer or copolymer.

20. A process for coating a glass container in order to prevent the scattering of glass fragments, said process comprising (A) preheating said glass container, (B) applying on the external wall surface of said container a non-tacky composite powder particle composition comprising (1) tacky powder particles comprising a melt blend mixture of (a) a block copolymer which is either unhydrogenated or selectively hydrogenated to at least some degree and having at least two kinds of polymer blocks wherein one polymer block is designated by A and a second polymer block is designated by B such that prior to hydrogenation, (1) each A is a polymer end block of a monovinyl or alpha alkyl monovinyl arene having a number average molecular weight in the range of from about 5,000 to about 75,000, said blocks A comprising from about 5 to about 50% by weight of the total block copolymer, and (2) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 50 to about 95% by weight of the total block copolymer, and (b) at least one melt flow modifier selected from the group consisting of (1) monovinyl arene homopolymers, (2) alpha alkyl monovinyl arene homopolymers, and (3) copolymers of monovinyl arenes and alpha alkyl monovinyl arenes, wherein the aromatic portions of the polymers described in (b) (1), (2), and (3) are at least partially hydrogenated to remove the aromatic character thereof, and adhering to the tacky surface of these tacky particles in a non-continuous layer, (2) smaller solid particles which are hard and non-tacky and which comprise at least one melt flow modifier of the group described in (B) (1) (b) with the provision that the melt flow modifier have a glass transition temperature of at least about 20° C., (C) baking the coated container until the composite powder particles become molten and form a smooth, molten coating on the external glass surface, (D) applying to said coated container a synthetic resin selected from the group consisting of epoxy resins, polyurethanes, polycarbonates, polyesters, polystyrenes, ethylene/vinyl acetate copolymers and acrylic homopolymers and copolymers wherein the synthetic resin is applied to substantially the entire outer surface of the first coating and also to a part of the external glass container surface, (E) baking said coated container until the synthetic resin forms a smooth coating, and (F) cooling said coated container to substantially ambient temperature.

21. A glass bottle coated on its outer surface to prevent the scattering of glass fragments which comprises
(A) a glass bottle
(B) an inner smooth non-particulate coating initially applied to (A) as non-tacky composite powder particles intimately contacted on the external wall surface of said bottle, said composite powder particles comprising
   (a) tacky powder particles comprising a melt blend mixture of
      (1) from about 25 to about 90% by weight of a block copolymer which is either unhydrogenated to at least about 10% and having at least two kinds of polymer blocks wherein one block is designated by A and a second polymer block is designated by B such that prior to hydrogenation,
         (a) each A is a polymer end block of a monovinyl or alpha alkyl monovinyl arene having a number average molecular weight in the range of from about 5,000 to about 75,000, said blocks A comprising from about 10 to about 40% by weight of the total block copolymer, and
         (b) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 60 to about 90% by weight of the total block copolymer,
      (2) from about 10 to about 75% by weight of at least one melt flow modifier selected from the group consisting of
         (a) monovinyl arene homopolymers,
         (b) alpha alkyl monovinyl arene homopolymers, and
         (c) copolymers of monovinyl arenes and alpha alkyl monovinyl arenes
      wherein the aromatic portions of the polymers described in (2) (a), (b) and (c) are at least partially hydrogenated to remove the aromatic character thereof,
      (3) from about 0.1 to about 8% by weight of at least one adhesion promoter, and
      (4) less than about 10% by weight of at least one member of the group consisting of stabilizers against oxidation and stabilizers against ultraviolet light, and
   (b) smaller solid particles, which are hard and non-tacky and which comprise at least one melt flow modifier of the group described in (a) (2) with the provision that the melt flow modifier have a glass transition temperature of at least about 20° C., adhering to the tacky surface of said tacky particles of (a) in a non-continuous layer, said composite powder particles being rendered in the configuration of a smooth non-particulate inner coating of the external surface of the glass container by heat and
(C) an outer top coat of a synthetic resin covering substantially the entire outer surface of said inner coat and a part of the external glass bottle surface and selected from the group consisting of epoxy resins, polyurethanes, polycarbonates, polyesters, polystyrenes, ethylene/vinyl acetate copolymers and acrylic homopolymers and copolymers wherein the outer film has high abrasion resistance, wet and dry scratch resistance, water resistance, chemical resistance, oil resistance, and weather resistance.

22. The glass bottle of claim 21, wherein said tacky powder particles of said non-tacky composite powder particles of (B) contain from about 45 to about 75% by weight of the block copolymer and from about 25 to about 55% by weight of the melt flow modifier.

23. The glass bottle of claim 21, wherein the block copolymer has a number average molecular weight of from about 30,000 to about 300,000.

24. The glass bottle of claim 21, wherein said adhesion promoter is selected from the group consisting of substituted silanes, the corresponding silanols, siloxanes, and mixtures thereof.

25. The glass bottle of claim 24, wherein said stabilizer is tetra-bis methylene 3-(3,5-ditert-butyl-4-hydroxyphenyl)propionate methane.

26. The glass bottle of claim 25, wherein said monovinyl arene portion of said block copolymer is styrene and wherein said conjugated diene portion of said block copolymer is unsubstituted alpha, gamma butadiene.

27. The glass bottle of claim 21, wherein said melt flow modifier is a partially hydrogenated copolymer consisting essentially of styrene and alpha methyl styrene.

28. The glass bottle of claim 27, wherein said copolymer of styrene and alpha methyl styrene is a random copolymer which is at least about 25% hydrogenated.

29. The glass bottle of claim 28, wherein said random copolymer of styrene and alpha methyl styrene comprises from about 15 to about 35% by weight styrene and from about 65 to about 85% by weight alpha methyl styrene.

30. The glass bottle of claim 25, wherein said adhesion promoter is gamma-glycidoxyproply-trimethoxy silane.

31. The glass bottle of claim 25, wherein said monovinyl arene is styrene, said conjugated diene is alpha, gamma butadiene, and said block copolymer is at least about 50% hydrogenated.

32. The glass bottle of claim 21, wherein the block copolymer is a radial block copolymer.

33. The glass bottle of claim 21, wherein said conjugated diene portion of said block copolymer is at least about 50% hydrogenated.

34. The glass bottle of claim 21, wherein said composition contains from about 1 to about 6% by weight of at least one adhesion promoter and from about 0.5 to about 5% by weight of at least one stabilizer.

35. The glass bottle of claim 21, wherein the initial powder particle size of the composite powder particles of (B) is from about 75 to about 250 micrometers.

36. The glass bottle of claim 21 wherein said composite powder particles of (B) contain from about 5 to about 15% by weight of said small, hard, non-tacky particles.

37. The glass bottle of claim 36 wherein said small, hard, non-tacky particles may contain from about 2 to about 6% by weight of an adhesion promoter.

38. The glass bottle of claim 37 wherein said adhesion promoter is selected from the group consisting of substituted silanes, the corresponding silanols, siloxanes, and mixtures thereof.

39. The glass bottle of claim 21 wherein said block copolymer is selectively hydrogenated to at least some degree.

40. The glass bottle of claim 21 wherein said glass bottle is pressurized.

41. The glass bottle of claim 21 wherein said glass bottle has a glass fragment retention of at least about 85%.

42. The glass bottle of claim 1 wherein said outer coat comprises an acrylic homopolymer or copolymer.

* * * * *